United States Patent
Haley

(10) Patent No.: US 10,807,668 B2
(45) Date of Patent: Oct. 20, 2020

(54) MOLDABLE BICYCLE SWEAT GUARD

(71) Applicant: Bradlee K Haley, Tacoma, WA (US)

(72) Inventor: Bradlee K Haley, Tacoma, WA (US)

(*) Notice: Subject to any disclaimer, the term of this patent is extended or adjusted under 35 U.S.C. 154(b) by 242 days.

(21) Appl. No.: 16/115,369

(22) Filed: Aug. 28, 2018

(65) Prior Publication Data
US 2020/0070918 A1 Mar. 5, 2020

(51) Int. Cl.
B62J 23/00 (2006.01)
B62J 1/28 (2006.01)

(52) U.S. Cl.
CPC ............ B62J 23/00 (2013.01); B62J 1/28 (2013.01)

(58) Field of Classification Search
CPC .......... B62J 23/00; B62J 1/28; B62J 19/00
USPC .......... 280/288.4, 304.3; 296/136.1, 136.11, 296/136.12; 150/163
See application file for complete search history.

(56) References Cited

U.S. PATENT DOCUMENTS

| | | | | |
|---|---|---|---|---|
| 3,284,130 A * | 11/1966 | Vaughn | ............ | B62J 17/08 296/78.1 |
| 3,738,704 A * | 6/1973 | Smith | ............ | B62J 1/14 297/195.13 |
| 4,045,077 A * | 8/1977 | DeVone | ............ | B62J 17/00 296/78.1 |
| 4,283,084 A * | 8/1981 | Gallagher | ............ | B62J 19/00 296/78.1 |
| 4,440,436 A * | 4/1984 | Giddens | ............ | B60J 7/1278 296/107.08 |
| 5,106,001 A * | 4/1992 | Figinski | ............ | B62J 11/00 224/418 |
| 5,326,122 A * | 7/1994 | Duffy | ............ | B62K 21/125 280/288.4 |
| 5,383,677 A * | 1/1995 | Thomas | ............ | B62J 99/00 280/288.4 |
| 5,458,390 A * | 10/1995 | Gilbert | ............ | B62J 17/00 296/78.1 |
| 5,562,139 A * | 10/1996 | Cseri | ............ | B62J 19/00 150/167 |
| 5,676,288 A * | 10/1997 | Spirk | ............ | B62J 19/00 150/167 |

(Continued)

FOREIGN PATENT DOCUMENTS

CN 202155017 U 3/2012

OTHER PUBLICATIONS

Tacx T2930 Sweat Cover, https://www.merlincycles.com/tacx-t2930-sweat-cover-72726.html, Jul. 24, 2018.

(Continued)

Primary Examiner — Tony H Winner
Assistant Examiner — Conan D Duda
(74) Attorney, Agent, or Firm — George A. Leone; Citadel Patent Law

(57) ABSTRACT

A moldable bicycle sweat guard with a cover having a front end, a rear end and mirror image outwardly curved sides extending along the length of the cover. The cover is wider proximate the front end and narrower proximate the rear end. A pair of moldable wires fastened along the edge of each side substantially following the curved shape, each of the pair of wires having a portion extending beyond the front end. An elastic cord it's fashion to have an adjustable rear loop and two front ends which are fastened onto the rear end of the cover.

15 Claims, 3 Drawing Sheets

(56) References Cited

U.S. PATENT DOCUMENTS

| | | | | |
|---|---|---|---|---|
| 5,795,009 | A * | 8/1998 | Sack | B62J 19/00 150/167 |
| 6,076,846 | A * | 6/2000 | Clardy | B62J 1/28 248/299.1 |
| 6,131,935 | A * | 10/2000 | Judkins | B62J 99/00 280/290 |
| 6,227,557 | B1 * | 5/2001 | Perret | B62J 17/08 280/288.4 |
| 6,516,844 | B1 * | 2/2003 | Henry | B62J 19/00 150/166 |
| 7,862,100 | B1 * | 1/2011 | Smith | B62J 19/00 135/88.04 |
| 7,896,014 | B1 * | 3/2011 | Chiang | B62J 17/08 135/88.04 |
| D675,974 | S * | 2/2013 | Nguyen | D12/402 |
| 9,027,995 | B2 * | 5/2015 | SanCartier | B62J 19/00 150/167 |
| 9,061,722 | B2 * | 6/2015 | SanCartier | B62J 19/00 |
| 9,795,856 | B2 | 10/2017 | Seilus | |
| 10,683,050 | B2 * | 6/2020 | McGriskin | B62J 23/00 |
| 2009/0075000 | A1 * | 3/2009 | Draghici | B32B 3/02 428/35.2 |
| 2012/0055598 | A1 * | 3/2012 | Teske | B60J 11/06 150/167 |
| 2012/0145292 | A1 * | 6/2012 | Saggau | B62J 19/00 150/167 |
| 2013/0126058 | A1 * | 5/2013 | Miller, Jr. | B62J 1/20 150/167 |
| 2013/0207423 | A1 * | 8/2013 | Russell | B62J 9/26 297/188.2 |
| 2014/0345760 | A1 * | 11/2014 | Saggau | B62J 19/00 150/167 |
| 2015/0041603 | A1 * | 2/2015 | Kinder | A47K 10/025 248/214 |
| 2016/0303460 | A1 * | 10/2016 | Seilus | A63B 71/00 |

OTHER PUBLICATIONS

Acekit Sweat Net Sweat Absorb Cover for Bicycle Trainer Indoor Cycling, https://www.amazon.com/Acekit-Absorb-Bicycle-Trainer-Cycling-Black/dp/B074PXVK89/ref=sr_1_12?ie=UTF8&qid=1532464784&sr=8-12&keywords=%E2%80%A6, Jul. 24, 2018.

BCP Universal Road Mountain Bike Bicycle Trainer Roller Sweat Absorb Guard Strap Net Cover, https://www.amazon.com/BCP-Universal-Mountain-Bicycle-Trainer/dp/B071S8N38C/ref=sr_1_9?ie=UTF8&qid=1532464784&sr=8-9&keywords=bicycl%E2%80%A6, Jul. 24, 2018.

RockBros Bicycle Trainer Sweat Net Frame Guard Absorbs Sweat Black Red, https://www.amazon.com/RockBros-Bicycle-Trainer-Sweat-Absorbs/dp/B01H6RN0AQ/ref=asc_df_B01H6RN0AQ/?tag=hyprod-20&linkCode=df0&hva%E2%80%A6, Jul. 24, 2018.

CycleOps Sweat Guard, https://www.google.com/shopping/product/5026228500705706251?lsf=seller:1209243, Jul. 24, 2018.

Tacx Sweat Cover, https://www.backcountry.com/tacx-sweat-cover?rr=t, Jul. 24, 2018.

Elite Protec Sweat Net, https://www.backcountry.com/elite-protec-sweat-net?rr=t, Jul. 24, 2018.

* cited by examiner

US 10,807,668 B2

MOLDABLE BICYCLE SWEAT GUARD

TECHNICAL FIELD

The present invention relates to bicycle sweat guards, more particularly, it relates to a moldable sweat guard for protecting bicycle parts from human perspiration during exercising.

BACKGROUND

Dedicated bicycle enthusiasts often spend significant amounts of training time with their bicycles held in a stationary mount. During exercise, the components of the bicycle must be protected from the deteriorating effects of human sweat which has been known to cause undesirable oxidation of the bicycle frame and components. Bicycle sweat guards made from cloth have been used for protection, but these can get saturated diminishing the amount of protection they offer. Further, commercially available sweat guards are not moldable and often interfere with the knee action of some bicycle riders. Further still, currently available sweat guards also interfere with handlebar grips due to the available devices used to clamp the sweat guards to bicycle handlebars.

The present invention provides, for the first time, a moldable, waterproof sweat guard.

BRIEF SUMMARY OF THE DISCLOSURE

This summary is provided to introduce, in a simplified form, a selection of concepts that are further described below in the Detailed Description. This summary is not intended to identify key features of the claimed subject matter, nor is it intended to be used as an aid in determining the scope of the claimed subject matter.

Disclosed herein is a moldable bicycle sweat guard with a cover having a front end, a rear end and mirror image outwardly curved sides extending along the length of the cover. The cover is wider proximate the front end and narrower proximate the rear end. A pair of moldable wires is fastened along the edge of each side substantially following the curved shape, each of the pair of wires having a portion extending beyond the front end. An elastic cord is shaped to have an adjustable rear loop and two front ends which are fastened onto the rear end of the cover.

BRIEF DESCRIPTION OF THE DRAWINGS

While the novel features of certain embodiments of the invention are set forth with particularity in the appended claims, the invention, both as to organization and content, will be better understood and appreciated, along with other objects and features thereof, from the following detailed description taken in conjunction with the drawings, in which:

Figure 1:
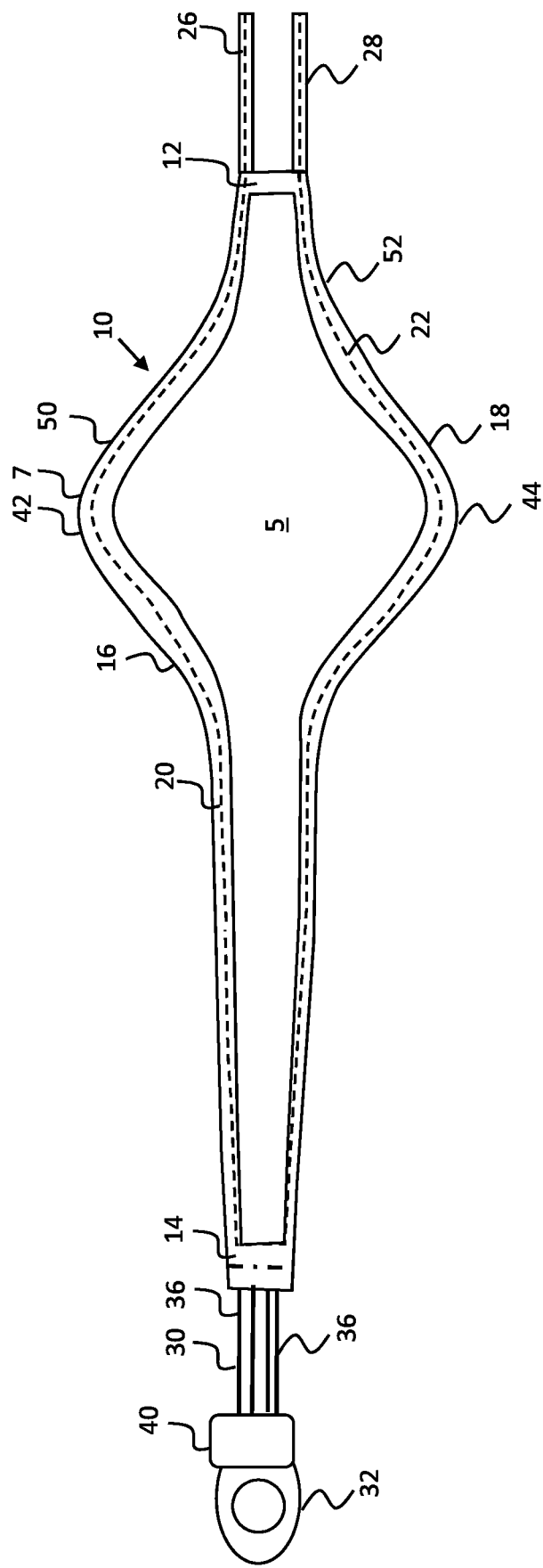
FIG. 1 schematically illustrates an example of a bicycle sweat guard.

In the drawings, identical reference numbers identify similar elements or components. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements and have been solely selected for ease of recognition in the drawings.

DETAILED DESCRIPTION

The following disclosure describes a moldable bicycle sweat guard. Several features of methods and devices in accordance with example embodiments are set forth and described in the figures. It will be appreciated that methods and devices in accordance with other example embodiments can include additional procedures or features different than those shown in the figures. Example embodiments are described herein with respect to a method and device directed to a bicycle sweat guard having custom moldable features. However, it will be understood that these examples are for illustrating the principles, and that the invention is not so limited.

Unless the context requires otherwise, throughout the specification and claims which follow, the word "comprise" and variations thereof, such as, "comprises" and "comprising" are to be construed in an open, inclusive sense that is as "including, but not limited to."

Reference throughout this specification to "one example," "an example embodiment," "one embodiment," "an embodiment" or combinations and/or variations of these terms means that a particular feature, structure or characteristic described in connection with the embodiment or example is included in at least one embodiment or example of the present disclosure. Thus, the appearances of the phrases "in one example" or "in an example" in various places throughout this specification are not necessarily all referring to the same example embodiment or example. Furthermore, the particular features, structures, or characteristics may be combined in any suitable manner in one or more embodiments or examples.

DEFINITIONS

Generally, as used herein, the following terms have the following meanings when used within the context of bicycle sweat guards:

The articles "a" or "an" and the phrase "at least one" as used herein refers to one or more.

As used herein, "plurality" is understood to mean more than one. For example, a plurality refers to at least two, three, four, five, ten, 25, 50, 75, 100, 1,000, 10,000 or more.

As used herein "neoprene" (also polychloroprene or pc-rubber) has its generally accepted meaning of a family of synthetic rubbers that are produced by polymerization of chloroprene.

"Obtaining" is understood herein as manufacturing, purchasing, or otherwise coming into possession of.

EXAMPLE EMBODIMENTS

Referring now to FIG. 1, an example of a bicycle sweat guard is schematically illustrated. A moldable bicycle sweat guard 10 includes a waterproof cover 5 having a front end 12, a rear end 14 and substantially mirror image outwardly curved sides 16, 18 extending along the length of the waterproof cover 5. In one example, the cover 5 is wider proximate the front end 12 and narrower proximate the rear end 14. A pair of moldable wires 20, 22 are fastened along the edge of each side 16, 18 substantially following the curved shape. Each of the pair of wires 20, 22 having an end portion 26, 28 extending beyond the front end 12. An elastic cord 30 fashion to have an adjustable rear loop 32 and two front ends 34, 36 fastened onto the rear end 14 of the cover. A shock cord fastener 40 may advantageously be used to tighten and loosen the elastic cord 30. The elastic cord 30 may be attached to the cover by sowing using a bias tape or the like. In one useful example, the cover 5 is shaped so as to have a bulge 7 proximate the front end 12, where the bulge 7 acutely narrows toward the front end 12 such that the front portions 26, 28 of the moldable wires are substantially parallel, and wherein the cover tapers gradually from the bulge 7 toward the rear end 14. The curved shape and bulge may advantageously resemble a "cobra" shape.

The cover may advantageously be made from waterproofing material such as natural fabrics or synthetic fabrics that are laminated to or coated with rubber, polyvinyl chloride (PVC), polyurethane (PU), silicone elastomer, fluoropolymers or the like and combinations thereof. In other useful examples, the cover may be made from neoprene, acrylic material, nylon or the like and combinations thereof.

In one example, each of the moldable wires 20, 22 are fastened to follow each edge 16, 18 using a first bias binding 42 and a second bias binding 44 fastened along the edge of each side. In one example, each bias binding 42, 44 is sewn onto the cover so as to form a channel 50, 52 adapted to hold one of the pair of moldable wires in place. The moldable wires may advantageously be metal wire or the like having a gauge of at least 0.08 inch adapted to be molded in three dimensions. To prevent rusting the wire is preferably galvanized, a rustproof metal or a metal treated to prevent rusting and to be impervious to human sweat. The end portion 26, 28 of each wire 20, 22 extends beyond the front 12 and is adapted to wrap around a portion of a bicycle handlebar (as shown in FIG. 2).

Figure 2:
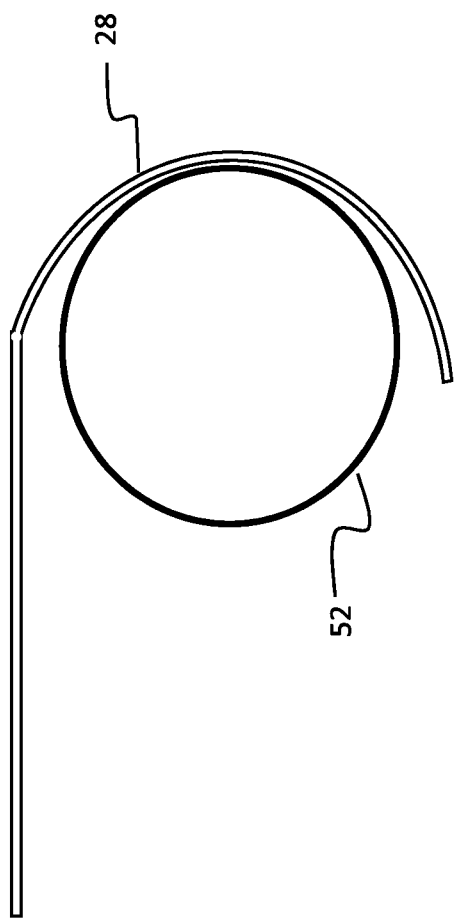
FIG. 2 schematically illustrates an example of the wire end of a moldable bicycle sweat guard fastened around a bicycle handlebar.

Referring now to FIG. 2, a cutaway side view of an example of the wire end of a moldable bicycle sweat guard fastened around a bicycle handlebar is schematically illustrated. A bicycle handlebar 52 is shown having an end portion 28 at least partially wrapped around the outer circumference of the handlebar. The front portions 26, 28 may advantageously be made long enough to grip a standard handlebar. For example, the ISO standard for the stem clamping area of a handlebar is 25.4 mm (1 in.), which is used on mountain bikes and many Japanese-made road handlebars. However, the Italian unofficial standard is 26.0 mm (1 1/32 in.), which is a common clamp size for road bars. The gripping portion of the handlebars are proportionate to the stem clamping area. Of course these may vary and the end portions 26, 28 may be made long enough to wrap around the handlebars if desired.

Figure 3:
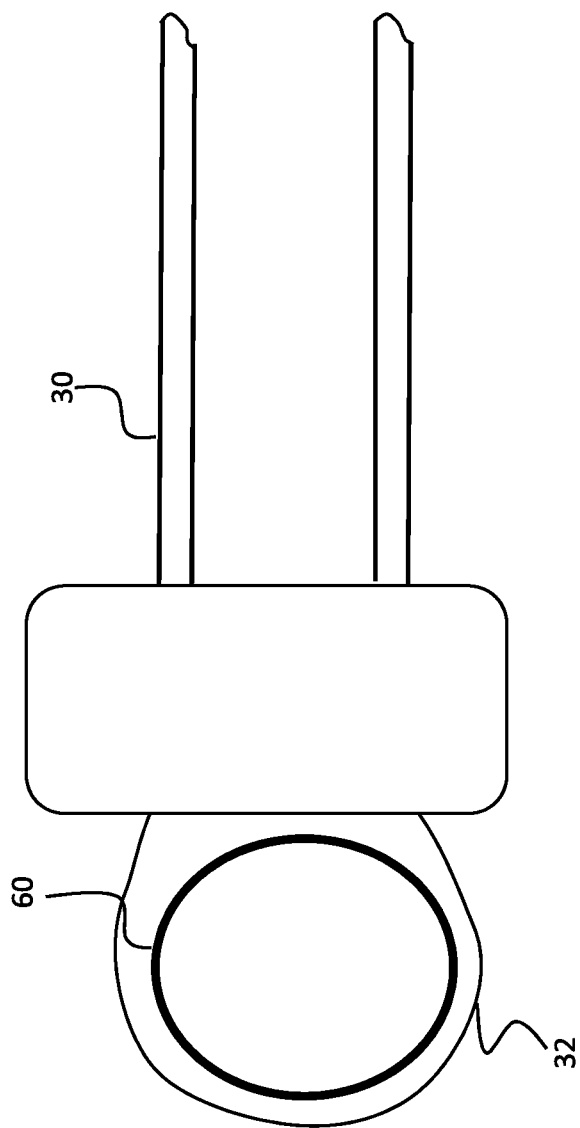
FIG. 3 shows a rear fastener of a moldable bicycle sweat guard fastened over a bicycle seat post.

Referring now to FIG. 3, an example of a rear fastener of a moldable bicycle sweat guard fastened over a bicycle seat post is shown. In one example, the elastic cord 30 may comprise a shock cord or a bungee cord having a diameter of at least 1/8 in. Of course, other sizes may be used depending on the application. The loop is adapted to fit around a bicycle seat post 60 which is a tube having diameters that commonly range from 22 mm to 35 mm in 0.2 mm increments. A typical size is 27.2 mm (1.07 in) for most higher-quality models. BMX bikes commonly use 25.4 seatposts. In some modern bikes with thicker alloy or carbon tubing, larger diameters such as 30.9 mm may be used.

Having described the components of the bicycle sweat guard device, it is now considered helpful to the understanding of the invention to describe its use by a typical bicycle rider. For example, the bicycle rider would attach the shock cord loop around a bicycle post and wrap the front portions 26, 28 of the pair of wires around bicycle handlebars proximate and on either side of the stem of the handlebars. The wrapped portions can be spaced so as not to interfere with the rider's preferred hand positions. The bicycle rider may then fashion the sweat cover by manipulating the pair of wires in three dimensions so that the bicycle sweat cover does not interfere with the bicycle rider's normal peddling.

In one example, a moldable bicycle sweat guard comprises a cover having a front end, a rear end and substantially mirror image outwardly curved sides extending along the length of the cover; wherein the cover is wider proximate the front end and narrower proximate the rear end; a pair of moldable wires fastened along the edge of each side substantially following the curved shape, each of the pair of wires having a portion extending beyond the front end; and an elastic cord fashion to include an adjustable rear loop and two front ends fastened onto the rear end of the cover.

In another example the cover comprises waterproofing material.

In another example, the cover comprises waterproofing material selected from the group consisting of natural fabrics or synthetic fabrics that are laminated to or coated with rubber, polyvinyl chloride (PVC), polyurethane (PU), silicone elastomer, fluoropolymers and combinations thereof.

In another example, the cover comprises neoprene, acrylic material or nylon.

In another example, the moldable wires comprise rust resistant metal wire.

In another example, a first bias binding and a second bias binding are fastened along the edge of each side, where each bias binding includes a channel adapted to hold one of the pair of moldable wires in place.

In another example, the elastic cord comprises a shock cord or a bungee cord.

In another example, the shock cord or a bungee cord have a diameter of at least 1/8 inch.

In another example, the portion of each pair of wires extending beyond the front are adapted to wrap around a portion of a bicycle handlebar.

In another example, the loop is adapted to fit around a bicycle seat post.

In another example, the cover is shaped so as to have a bulge proximate the front end, acutely narrowing toward the front end such that the front portions of the moldable wires are substantially parallel, and wherein the cover tapers gradually toward the rear end.

The invention has been described herein in considerable detail in order to comply with the Patent Statutes and to provide those skilled in the art with the information needed to apply the novel principles of the present invention, and to construct and use such exemplary and specialized components as are required. However, it is to be understood that the invention may be carried out by different equipment, and devices, and that various modifications, both as to the equipment details and operating procedures, may be accomplished without departing from the true spirit and scope of the present invention.

What is claimed is:

1. A moldable bicycle sweat guard comprising:
    a cover having a front end, a rear end and substantially mirror image outwardly curved sides extending along the length of the cover;
    wherein the cover is wider proximate the front end and narrower proximate the rear end;

a pair of moldable wires fastened along the edge of each side substantially following the curved shape, each of the pair of wires having a portion extending beyond the front end that is adapted to wrap around a portion of a bicycle handlebar; and an elastic cord including an adjustable rear loop and two front ends fastened onto the rear end of the cover the rear loop adapted to fit around a bicycle seat post.

2. The moldable bicycle sweat guard of claim 1 wherein the cover comprises waterproofing material.

3. The moldable bicycle sweat guard of claim 1 wherein the cover comprises waterproofing material selected from the group consisting of natural fabrics or synthetic fabrics that are laminated to or coated with rubber, polyvinyl chloride (PVC), polyurethane (PU), silicone elastomer, fluoropolymers and combinations thereof.

4. The moldable bicycle sweat guard of claim 1 wherein the cover comprises neoprene, acrylic material or nylon.

5. The moldable bicycle sweat guard of claim 1 wherein the moldable wires comprise rust resistant metal wire.

6. The moldable bicycle sweat guard of claim 1 further comprising a first bias binding and a second bias binding fastened along the edge of each side, where each bias binding includes a channel adapted to hold one of the pair of moldable wires in place.

7. The moldable bicycle sweat guard of claim 1 wherein the elastic cord comprises a shock cord or a bungee cord.

8. The moldable bicycle sweat guard of claim 7 wherein the shock cord or the bungee cord have a diameter of at least ⅛ inch.

9. The moldable bicycle sweat guard of claim 1 wherein the cover is shaped so as to have a bulge proximate the front end, acutely narrowing toward the front end such that the front portions of the moldable wires are substantially parallel, and wherein the cover tapers gradually toward the rear end.

10. A moldable bicycle sweat guard comprising:

a waterproof cover having a front end, a rear end and substantially mirror image outwardly curved sides extending along the length of the cover;

wherein the cover is wider proximate the front end and narrower proximate the rear end;

a pair of moldable wires fastened with bias binding along the edge of each side substantially following the curved shape, each of the pair of wires having a portion extending beyond the front end, wherein the portion of each pair of wires extending beyond the front are adapted to wrap around a portion of a bicycle handlebar, wherein the pair of moldable wires are adapted to be moldable in three dimensions; and a shock cord or a bungee cord, having an adjustable rear loop and a fastener, the adjustable rear loop adapted to fit over a bicycle post, the shock cord or the bungee cord having two front ends fastened to the rear end of the cover.

11. The moldable bicycle sweat guard of claim 10 wherein the waterproof cover comprises waterproofing material selected from the group consisting of natural fabrics or synthetic fabrics that are laminated to or coated with rubber, polyvinyl chloride (PVC), polyurethane (PU), silicone elastomer, fluoropolymers and combinations thereof.

12. The moldable bicycle sweat guard of claim 10 wherein the waterproof cover comprises neoprene, acrylic material or nylon.

13. The moldable bicycle sweat guard of claim 10 wherein the moldable wires comprise rust resistant metal wire.

14. The moldable bicycle sweat guard of claim 10 wherein the shock cord or a bungee cord have a diameter of at least ⅛ inch.

15. The moldable bicycle sweat guard of claim 10 wherein the cover is shaped so as to have a bulge proximate the front end, acutely narrowing toward the front end such that the front portions of the moldable wires are substantially parallel, and wherein the cover tapers gradually toward the rear end.

* * * * *